United States Patent Office 3,248,438
Patented Apr. 26, 1966

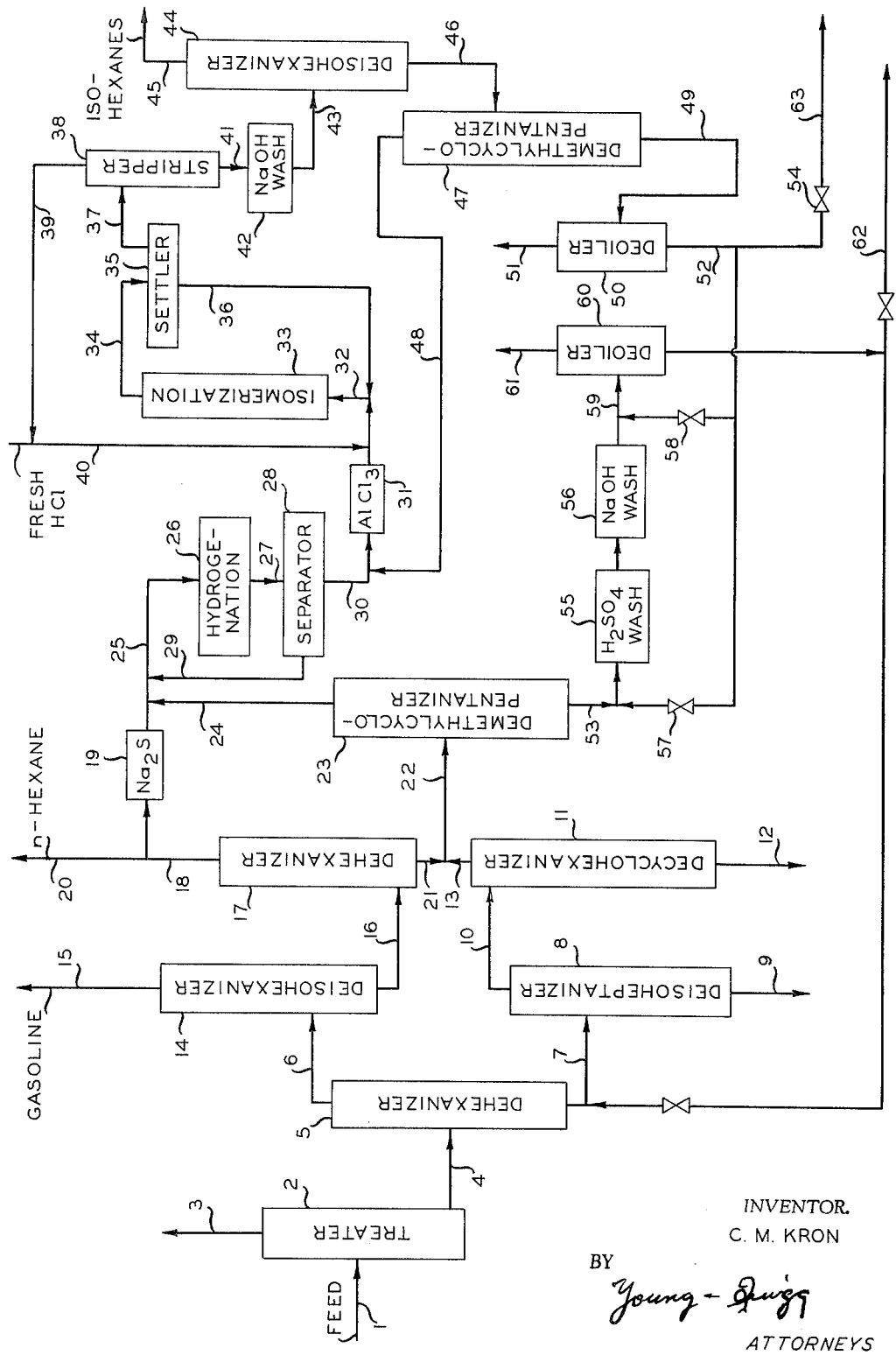
April 26, 1966     C. M. KRON     3,248,438
SEPARATION OF CYCLOHEXANE
Filed Nov. 29, 1962
INVENTOR.
C. M. KRON
BY
Young - Quigg
ATTORNEYS North

3,248,438
SEPARATION OF CYCLOHEXANE
Carl M. Kron, Houston, Tex., assignor to Phillips Petroleum Company, a corporation of Delaware
Filed Nov. 29, 1962, Ser. No. 240,992
1 Claim. (Cl. 260—666)

This invention relates to recovery of cyclohexane from hydrocarbon mixtures. In one of its aspects, the invention relates to recovery of cyclohexane from a hydrocarbon mixture wherein the mixture is first separated into a normal hexane and methylcyclopentane containing stream and a natural cyclohexane containing stream, the normal hexane and methylcyclopentane containing stream is hydrogenated and isomerized, there is separated from the resulting isomerized stream a high purity cyclohexane product stream and a cyclohexane and heavier stream, and this latter cyclohexane and heavier containing stream is admixed with the natural cyclohexane containing stream with the resulting admixed stream being separated to produce an increased amount of a cyclohexane-rich product stream. In another aspect, the invention relates to process and apparatus for increasing recovery of cyclohexane from a hydrocarbon mixture wherein the mixture is separated into a first stream comprising normal hexane and methylcyclopentane which is subsequently hydrogenated and isomerized and then separated to recover a high purity cyclohexane product stream, and a second natural cyclohexane containing stream; heavy ends obtained during separation of the isomerized stream are admixed with the natural cyclohexane containing stream whereby there is obtained increased overall recovery of a cyclohexane-rich product stream.

As the demand and price of cyclohexane have increased, it has become increasingly important to the industry to recover cyclohexane from hydrocarbon mixtures with more thoroughness and efficiency.

Accordingly, it is an object of this invention to produce and recover increasing amounts of cyclohexane from hydrocarbon mixtures. It is another object of this invention to provide for more thorough and effective recovery of cyclohexane from existing process streams.

Other aspects, objects and the several advantages of the invention are apparent from this description, the drawing and the appended claim.

According to the present invention, there are provided process and apparatus for recovering cyclohexane from a feed comprising a mixture of $C_6$ hydrocarbons which comprises:

(a) Passing said feed to a first separation zone, (b) Separating said feed in said first separation zone, into a light fraction comprising n-hexane, methylcyclopentane, and benzene and a heavy fraction comprising cyclohexane and heavier, (c) Hydrogenating the light fraction of step "b" to reduce its benzene content, (d) Isomerizing the hydrogenated light stream from step "c" to convert n-hexane to isohexanes and methylcyclopentane to cyclohexane, (e) Separating the isomerized stream of step "d" into a light fraction comprising methylcyclopentane and un-isomerized n-hexane and a heavy fraction comprising cyclohexane and heavier, (f) Separating the heavy fraction of step "e" into a lighter fraction comprising high purity cyclohexane and a heavier fraction comprising cyclohexane and heavier, (g) Admixing the heavy fraction of step "b" with the heavier fraction of step "f," and (h) Separating from the thus-admixed stream of step "g" a cyclohexane-rich product.

The drawing shows an operation in flow-diagram form for recovery of cyclohexane according to the present invention.

Referring now to the drawing in detail, a feed stream, which can comprise, for example, a natural or straight-run gasoline, is passed by way of conduit 1 to a preliminary treating zone 2. This treating zone 2 can comprise a combination of fractionation, chemical treating and solvent extraction, for example, as is known in the art, and has as its objects the separation of various light products, such as pentanes, butanes, L.P.G., fuel gas, and the like which are removed by way of conduit 3 and the preparation of the remaining feed which is removed by way of conduit 4. The remaining feed in conduit 4 comprises $C_6$ hydrocarbons and heavier, and is passed to separator 5 which is preferably a fractionation column. In this column, the feed is separated into a stream comprising n-hexane and lighter by way of conduit 6 and a stream comprising methylcyclopentane (MCP) and heavier by way of conduit 7. This latter stream in conduit 7 is further separated as by fractionator 8 into a stream comprising n-heptane and heavier which can be passed by way of conduit 9 to, for example, a Platforming process, and a stream comprising isoheptane and lighter which is passed by way of conduit 10 for further separation to fractionator 11. Separation zone 11 is operated so as to produce as kettle product a stream comprising isoheptanes which are removed by way of conduit 12 to Platforming, for example, and, as overhead product, a stream comprising cyclohexane and lighter by way of conduit 13, further treatment of which will be described hereinbelow.

Returning now to the stream in conduit 6, this stream is passed to separator 14 in which isohexanes and lighter are taken overhead by way of conduit 15 and can, for example, be passed to aviation gasoline blending. The kettle product from this separation comprises n-hexane and heavier, and is passed by way of conduit 16 to separator 17. Overhead from this column comprises n-hexane which is passed by way of conduit 18 to treatment, for example, by sodium sulfide in zone 19; a portion of this n-hexane can be withdrawn by way of conduit 20 as product. Kettle product from this separation zone, comprising methylcyclopentane, cyclohexane and benzene, is passed by way of conduit 21 into admixture with the stream in conduit 13, aforementioned.

The resulting admixture in conduit 22, comprising methylcyclopentane, benzene, and cyclohexane, is passed to separation zone 23, which is operated to produce overhead a stream comprising methylcyclopentane, benzene, and some n-hexane by way of conduit 24. Stream 24 is combined with the effluent from treating zone 19 and passed by way of conduit 25 to hydrogenation zone 26, wherein benzene is hydrogenated to cyclohexane. The hydrogenated effluent is passed by way of conduit 27 to separator 28, wherein hydrogen is separated and can be recycled by way of conduit 29. The hydrogenated stream is then passed by way of conduit 30 to a refortification chamber, which contains aluminum chloride, 31. The process stream with suspended aluminum chloride is passed by way of conduit 32 to isomerization zone 33 which is operated to isomerize n-hexane to isohexanes and methylcyclopentane to cyclohexane. The catalyst in this zone preferably comprises an aluminum chloride-hydrogen chloride-hydrocarbon sludge, as is known in the art. Effluent from the isomerization zone is passed by way of conduit 34 to a settling zone 35, wherein the catalyst is settled out and recycled by way of conduit 36 to the reactor. The isomerized hydrocarbon phase is passed by way of conduit 37 to a hydrogen chloride stripper 38, wherein hydrogen chloride is removed and can be recycled by way of conduit 39. Fresh acid can be added to the system by way of conduit 40. The isomerizate is then passed by way of conduit 41 to treating zone 42, wherein it can be subjected, for example, to a sodium hydroxide wash. This stream is then passed by way of conduit 43 to separator 44 which is operated to produce overhead isohexanes, which can be removed as a product of the process by way of conduit 45, and as kettle product a mixture comprising n-hexane, methylcyclopentane, cyclohexane, and heavier. This latter stream is passed by way of conduit 46 to separator 47, which is operated to produce overhead a stream comprising n-hexane and methylcyclopentane; this stream is preferably recycled for isomerization by way of conduit 48. Kettle product from separator 47, comprising cyclohexane and heavier, is passed by way of conduit 49 to separator 50. This separator is operated to produce a high purity cyclohexane product overhead, such as 98 percent cyclohexane, by way of conduit 51 as a product of the process.

According to the invention, kettle product from separator 50, which comprises cyclohexane and heavier, is removed by way of conduit 52; this stream is preferably passed in its entirety into admixture with kettle product from separator 23 in conduit 53; however, if desired, a portion of this stream in conduit 52 can be withdrawn by way of conduit 63 and its associated valve 54 for use as motor fuel blending stock. Kettle product from column 50 can be blended with kettle product from column 23 either prior or subsequent to treatment of the latter by, for example, sulfuric acid and caustic washes. These washes are shown in the drawing as items 55 and 56, respectively; valves 57 and 58 are provided in conduit 52 to allow the admixture prior to or subsequent to the wash treatments. The resulting blended stream is passed by way of conduit 59 to separator 60, which is operated to produce overhead by way of conduit 61 a cyclohexane-rich stream as a product of the process; this stream can, for example, contain about 85 percent cyclohexane. Kettle product from separator 60, comprising cyclohexane and heavier, is withdrawn by way of conduit 62, and can, for example, be utilized in motor fuel blending, or might be passed in its entirety into admixture with kettle product from separator 5 in conduit 7.

According to this invention, it has been found that addition of kettle product from separator 50 to the kettle product from separator 23 results in recovery, in separator 60, of over 90 percent of the cyclohexane added by way of conduit 52; thus, it is seen that losses of valuable cyclohexane by way of conduits 63 and 62 are substantially decreased by practice of this invention.

The invention will now be more fully explained by reference to the following specific example, in which the last vertical column represents average figures for five consecutive days' operation.

Table I

| Conduit | Total Cyclohexane (average gallons per day) | |
|---|---|---|
| | Before invention, i.e., valves 57 and 58 closed, valve 54 open | After invention, i.e., valves 54 and 58 closed, valve 57 open |
| Feed to col. 60 | 59 | 54,000 / 43,320 | 58,400 |
| Column 60 O.H.P. | 61 | 50,000 / 43,000 | 51,800 / 44,500 |
| Column 60 K.P. | 62 | 4,000 / 320 | 6,600 / 430 |
| Column 23 K.P. | 53 | ------ | 54,100 / 43,530 |
| Column 50 K.P. | 53 | ------ | 4,400 / 1,400 |

From the foregoing table, it is seen that, prior to the practice of this invention, there was recovered by way of conduit 61 a total of 43,000 gallons per day of cyclohexane. After addition of the kettle product from column 50 to the feed of column 60, it is seen that cyclohexane was recovered by way of conduit 61 in the amount of 44,500 gallons per day. It can be seen that, by using existing equipment with the addition of this invention, there is now recovered, by way of conduit 61, 44,500 gallons per day of cyclohexane as opposed to the former average figure of 43,000 gallons per day.

Reasonable variation and modification are possible within the scope of the foregoing disclosure, the drawing, and the appended claim to the invention, the essence of which is that there have been provided process and apparatus for increased recovery of natural and manufactured cyclohexane which comprises adding the column bottoms from the high purity manufactured cyclohexane separation column to the feed of the natural cyclohexane purification column.

I claim:

A process for obtaining increased recovery of cyclohexane from a natural gasoline feed which comprises
  (a) separating from said feed a stream comprising $C_5$ hydrocarbons and lighter,
  (b) passing the remainder of said feed to a separating zone wherein said remainder is separated into a first fraction comprising hexane and lighter and a second fraction comprising methylcyclopentane and heavier,
  (c) separating from said first fraction a stream comprising i-hexane and lighter to obtain a first remainder comprising n-hexane, methylcyclopentane and benzene,
  (d) separating from said second fraction a stream comprising heptanes and heavier to obtain a second remainder comprising hexanes, cyclohexane and methylcyclopentane,
  (e) combining said first remainder and said second remainder,
  (f) separating the thus-combined stream of step "e" into a light fraction comprising n-hexane, methylcyclopentane and benzene and a heavy fraction comprising cyclohexane and heavier,
  (g) hydrogenating and isomerizing the light fraction of step "f" to favor increased cyclohexane production,
  (h) separating isohexanes formed in the isomerization from the hydrogenated and isomerized stream and removing said isohexanes as a product,
  (i) separating the isohexane free hydrogenated and isomerized stream of step "h" into a light fraction comprising methylcyclopentane and unisomerized n-hexane and a heavy fraction comprising cyclohexane,
  (j) admixing the light fraction of step "i" comprising methylcyclopentane and unisomerized n-hexane with the light fraction of step "f" subsequent to the hydrogenation but prior to the isomerization of step "g,"
  (k) separating the heavy fraction of step "i" into a lighter fraction comprising high purity cyclohexane and a heavier fraction comprising cyclohexane and heavier,
  (l) treating the heavy fraction of step "f" sequentially with acid and caustic washes,
  (m) admixing only the treated heavy fraction of step "f" with the heavier fraction of step "k," and
  (n) separating from the thus-admixed stream of step "m" a cyclohexane-rich product without previous treatment.

References Cited by the Examiner

UNITED STATES PATENTS

| 2,415,066 | 1/1947 | Ross et al. | 260—666 |
| 2,436,900 | 3/1948 | Roberts | 260—683.74 |
| 3,009,002 | 11/1961 | Kron | 260—666 |
| 3,121,676 | 2/1964 | Skraba | 208—96 X |

DELBERT E. GANTZ, *Primary Examiner.*

ALPHONSO D. SULLIVAN, *Examiner.*